(No Model.)

C. HOHNSBEHN.
CENTRIFUGAL CREAM SEPARATOR.

No. 596,508. Patented Jan. 4, 1898.

Witnesses:
R. J. Orwig.
Jas Darels.

Inventor: Claus Hohnsbehn,
By Thomas G. and J. Ralph Orwig,
attorneys.

UNITED STATES PATENT OFFICE.

CLAUS HOHNSBEHN, OF WAVERLY, IOWA.

CENTRIFUGAL CREAM-SEPARATOR.

SPECIFICATION forming part of Letters Patent No. 596,508, dated January 4, 1898.

Application filed March 1, 1897. Serial No. 625,480. (No model.)

*To all whom it may concern:*

Be it known that I, CLAUS HOHNSBEHN, a citizen of the United States, residing at Waverly, in the county of Bremer and State of Iowa, have invented a new and useful Centrifugal Cream-Separator, of which the following is a specification.

The object of this invention is to provide an attachment to be applied to the interior of the bowl of a centrifugal cream-separator, whereby the process of separation is accelerated and made more thorough and the capacity of the separator at a given rate of speed in a given time is increased and whereby all foreign substances of greater specific gravity than the skim-milk are retained within the separator to be removed therefrom after the process of separation has ceased.

My invention consists in certain details in the construction, arrangement, and combination, with a separating-bowl, of the bell-shaped partition and the bottom therefor.

My invention consists, further, in the arrangement and combination thereof with the other parts of a separator, as hereinafter set forth, pointed out in my claim, and illustrated in the accompanying drawings, in which—

Figure 1:
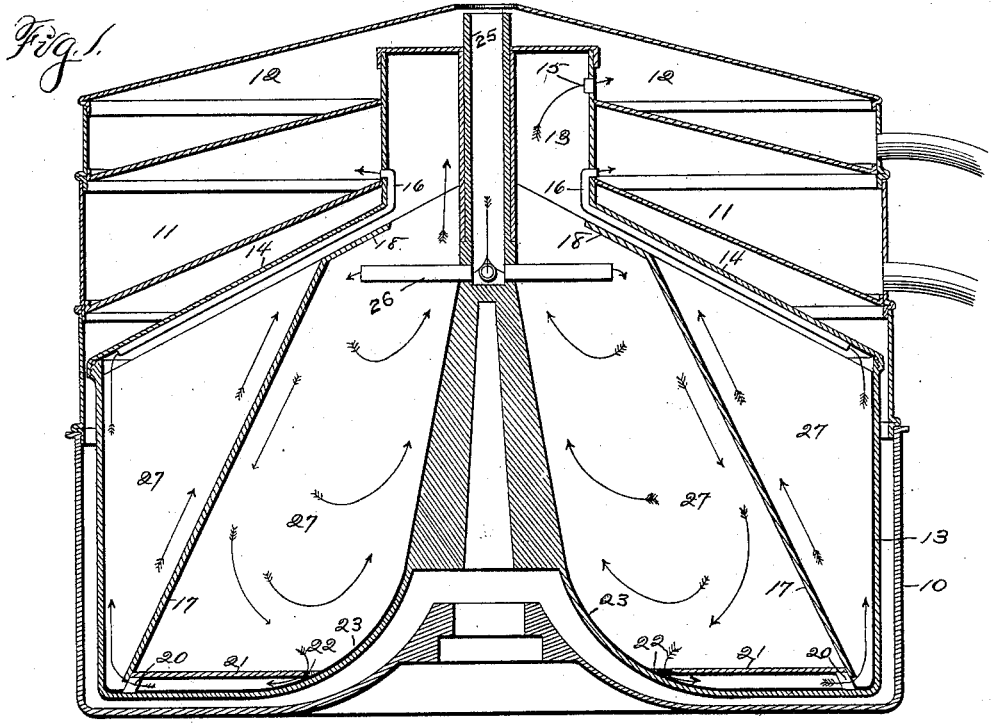
Figure 2:
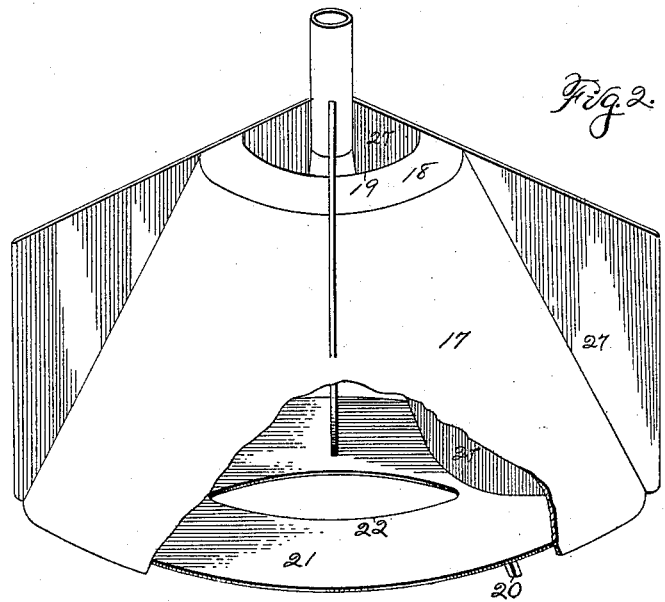

Figure 1 shows a vertical transverse sectional view of the separating-bowl and connected parts, with my improved device in position therein. Fig. 2 shows a perspective view of the bell-shaped partition, a part of which is broken away to show the disk on its interior.

Referring to the accompanying drawings, the reference-numeral 10 is used to indicate a support for the separating-bowl. At its top are attached the pan 11, into which the milk is discharged, and also the pan 12, into which the cream is discharged. The reference-numeral 13 indicates a separating-bowl arranged for rotation within the support 10 and having an inclined top 14 secured thereto. Within this top 14 is a cream-discharge opening 15 and a series of tubes 16 to gather milk from the outer edges of the separating-bowl and discharge it into the milk-chamber 11. All of these parts are of the construction common in separators of this class, and hence a description of their various details of construction is deemed superfluous.

The reference-numeral 17 is used to indicate a bell-shaped partition having an inwardly-projecting flange 18 at its top provided with a central opening 19, and its lower end is of such size as to extend to a point near the lower corner of the interior of the separating-bowl. On the lower edge of this partition is a number of feet 20, designed to support the bell-shaped partition a slight distance above the bottom of the separating-bowl. The essential novelty, however, of this invention consists in a flat disk 21, having a central opening 22. This disk is of a size to fit into the lower end of the bell-shaped partition and to rest upon the feet 20. The opening in the central portion of the disk is a trifle larger than the raised portion 23 on the interior of the separating-bowl, so that a small circular opening is provided between the inner edge of the disk and the central portion of the separating-bowl, so that milk can pass downwardly through said opening and then horizontally outward under the said disk to the interior of the separating-bowl outside of the bell-shaped partition.

The reference-numeral 25 is used to indicate a tube fixed to the raised central portion of the bowl to project upwardly to the top of the bowl. At the lower end of this tube is a number of outwardly-projecting pipes 26, whereby milk may be fed into the top of the aforesaid pipe and pass into the interior of the bell-shaped partition through the said tubes.

The reference-numeral 27 is used to indicate a series of wings supported by the bell-shaped partition and the disk at its bottom to approximately fill the interior of the separating-bowl.

In practical operation milk is fed to the interior of the bell-shaped partition in the manner just described, and the centrifugal action will cause the heavier parts of the milk to pass to the interior of the bell-shaped partition and then downwardly, while the lighter parts will pass to the center and gradually rise. The pressure of the inflowing milk will force the milk on the interior of the bell-shaped partition downwardly, and its only point of escape being through the opening at the central portion of the disk it will be compelled to move inwardly against the action of centrifugal force and then downwardly and outwardly to the interior of the separating-bowl on the exterior of the bell-shaped partition. When at this point, the process of separation is again carried out, the heavier particles passing to the outer edge of the interior of the bowl and the cream or the lighter particles remaining close to the exterior of the bell-shaped partition. The travel of the milk at all points in the operation of the device is traced on Fig. 1 of the drawings by arrows. It is to be noted particularly in this instance, inasmuch as the heavier particles of the milk on the interior of the bell-shaped partition must pass inwardly against the action of centrifugal force before they can pass downwardly and out into the separating-bowl, that the lighter particles at this point are given ample opportunity to rise along the raised central portion of the bowl instead of passing downwardly through the opening in the disk. Thus the separation at this point is made very complete. Furthermore, it will be noted that particles having a greater specific gravity than the milk—such, for instance, as sand and other foreign matter liable to be found in milk—will be thrown at once into the corner formed by the intersection of the bell-shaped partition and the disk. The milk will form a circuit which does not enter into the farthest recess of the said corner and hence will not tend to drive the particles therefrom. Thus the milk and cream are not only separated in this device, but all foreign substances are removed therefrom.

Having thus described my invention, what I claim as new therein, and desire to secure by Letters Patent of the United States therefor, is—

A centrifugal cream-separator, comprising in combination, a separating-bowl, an upwardly-extending projection on its bottom, a feed-pipe extended through its top and connected with the said projection at its bottom, tubes extending radially from the lower end of the said milk-feeding pipe, an approximately bell-shaped partition open at its top placed in the separating-bowl with its upper end projected above the said milk-feeding tubes, a flat bottom in the said bell-shaped partition having a central opening slightly larger than the projection at the bottom of the separating-bowl, a series of radial plates fixed to the bell-shaped partition and said bottom to approximately fill the interior of the separating-bowl, and means for drawing off the separated cream and skimmed milk from the top of the bowl, all arranged and combined substantially in the manner set forth and for the purposes stated.

CLAUS HOHNSBEHN.

Witnesses:
W. F. WEIDEMANN,
S. H. MORSE.